(12) United States Patent
Colas et al.

(10) Patent No.: US 9,568,258 B1
(45) Date of Patent: Feb. 14, 2017

(54) THERMAL FLUID MODELING WITH PHYSICAL NETWORK APPROACH AND USING CONDUCTION AND CONVECTION

(71) Applicant: The MathWorks, Inc., Natick, MA (US)

(72) Inventors: Dorian Colas, Boston, MA (US); Jeffrey M. Wendlandt, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 558 days.

(21) Appl. No.: 13/624,392

(22) Filed: Sep. 21, 2012

Related U.S. Application Data

(60) Provisional application No. 61/651,709, filed on May 25, 2012.

(51) Int. Cl.
*G06G 7/56* (2006.01)
*F28F 13/00* (2006.01)

(52) U.S. Cl.
CPC ............ *F28F 13/00* (2013.01); *F28F 2260/02* (2013.01)

(58) Field of Classification Search
None
See application file for complete search history.

(56) References Cited

PUBLICATIONS

Sodja et al. Modelling thermal processes in building using an object-oriented approach and Modelica Simulation Modelling Practice and Theory 17, 2009, pp. 1143-1159.*

Bicklet et al. The Transport of Heat and Matter by Fluids During Metamorphism Contrib Mineral Petrol, 1987, pp. 384-392.*
Nield et al. Thermally developing forced convection in a porous medium: parallel plate channel with walls at uniform temperature, with axial conduction and viscous dissipation effects International Journal of Heat and Mass Transfer, 46, 2003, pp. 643-651.*
Zhang et al. Measurement and Modeling of Two-Phase Flow in Microchannels With Nearly Constrant Heat Flus Boundary conditions Journal of Microelectromechanical Systems, vol. 11, No. 1, Feb. 2002.*
"ANSYS CFX-Solver Theory Guide", Ansys, Inc., Release 12.0, Apr. 2009, http://www.ansys.com, pp. 1-261.
Anton Bergant et al., "Developments in Unsteady Pipe Flow Friction Modelling", Journal of Hydraulic Research, vol. 39, 20014, No. 3, Revision received Oct. 23, 2000, 9 pages.
(Continued)

*Primary Examiner* — Omar Fernandez Rivas
*Assistant Examiner* — Cuong Luu
(74) *Attorney, Agent, or Firm* — Harrity & Harrity, LLP

(57) ABSTRACT

A device receives information associated with a physical network, and creates a thermal fluid model, based on the information and with a technical computing environment (TCE), the thermal fluid model including at least a first block, a second block, and a node connecting the first block and the second block. The device calculates a first convection power flux for the first block and a second convection power flux for the second block, and calculates a first conduction power flux for the first block and a second conduction power flux for the second block. The device adds the first convection power flux and the first conduction power flux to determine a first power flux, and adds the second convection power flux and the second conduction power flux to determine a second power flux. The device outputs the first power flux and the second power flux.

38 Claims, 12 Drawing Sheets

(56) References Cited

PUBLICATIONS

Alok K. Majumdar et al., "Fast, Nonlinear Network Flow Solvers for Fluid and Thermal Transient Analysis", International Journal of Numerical Methods for Heat & Fluid Flow, vol. 20, No. 6, 2010, pp. 617-637, www.emeraldinsight.com/0961-5539.htm.

Rüdiger Franke et al., "Stream Connectors—An Extension of Modelica for Device-Oriented Modeling of Convective Transport Phenomena", Proceedings $7^{th}$ Modelica Conference, Como, Italy, Sep. 20-22, 2009, pp. 108-121.

* cited by examiner

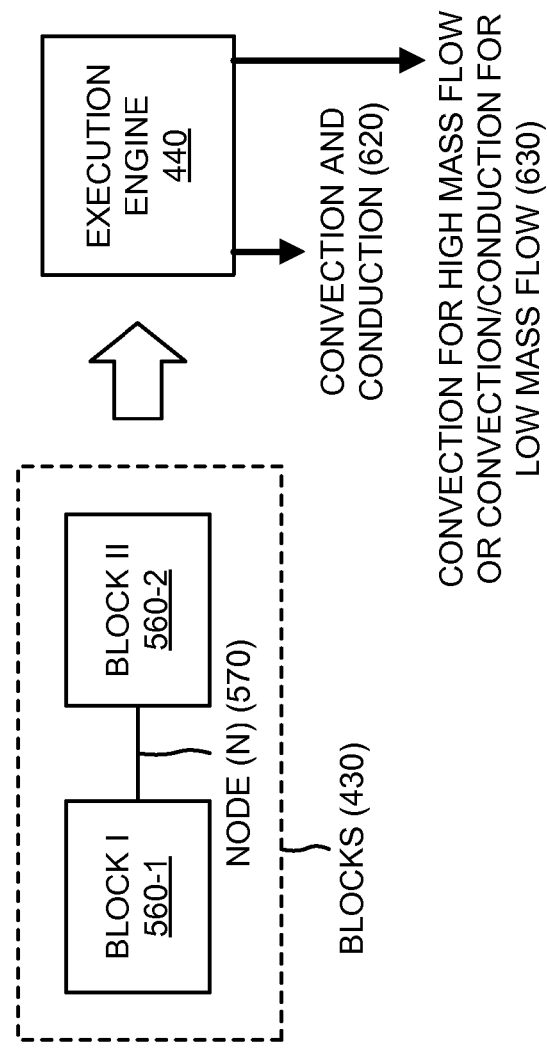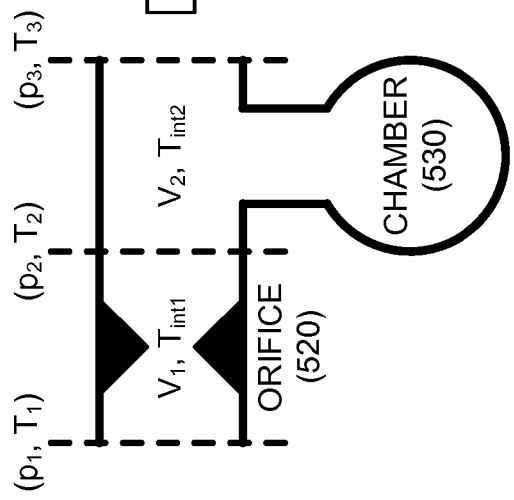
FIG. 6

US 9,568,258 B1

THERMAL FLUID MODELING WITH PHYSICAL NETWORK APPROACH AND USING CONDUCTION AND CONVECTION

RELATED APPLICATION

This application claims priority under 35 U.S.C. §119 based on U.S. Provisional Patent Application No. 61/651,709, filed May 25, 2012, the disclosure of which is incorporated by reference herein in its entirety.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 6 is a diagram of further example interactions between the physical network and the thermal fluid model depicted in FIG. 5;

DETAILED DESCRIPTION

Figure 1:
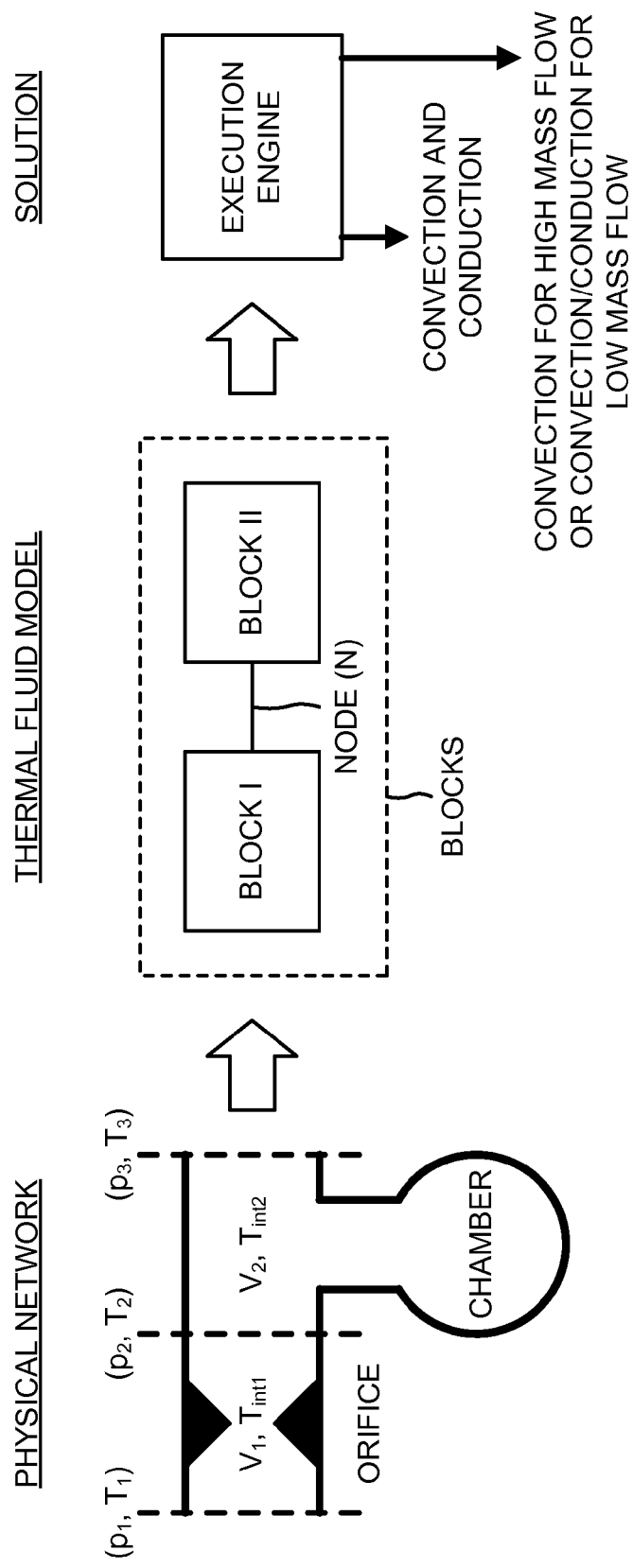
FIG. 1 is a diagram of an overview of an example implementation described herein.

The following detailed description refers to the accompanying drawings. The same reference numbers in different drawings may identify the same or similar elements.

A modeling environment (e.g., the Simscape™ software by The MathWorks, Inc.) that employs a physical network approach may include a set of block libraries and special simulation features for modeling physical systems. The physical network approach is particularly suited for simulating systems that consist of real physical components. This modeling environment permits creation of a network representation of a system under design, based on the physical network approach. According to the physical network approach, each system is represented by functional blocks that interact with each other by exchanging energy through their connection nodes or ports. The nodes are bidirectional and mimic physical connections between blocks.

The physical network approach considers the computation of physical values resulting from advection-diffusion type conservation equations. In the physical network approach, a physical network of actual components (e.g., pumps, valves, etc.) is represented by blocks that are connected at nodes. The blocks may represent actual control volumes drawn around each of the physical components or around multiple physical components (e.g., in a larger control volume analysis). Information is propagated and stored in the model using "across" and "through" variables. The nodes store the "across" variables common to every connected block, and the blocks store the "through" variables. In other words, the blocks may interact with the rest of the model only through these two types of variables.

To ensure conservation of physical values, a model solver may require an algebraic sum of "through" variables, such as mass flow or power flux, to be zero at connecting nodes. More specifically, for an energy equation written in the form of a macroscopic balance, the "across" variable would be a temperature or an enthalpy and the "through" variable would be a power flux. Power flux (or energy flux) ($\Phi_E$) is the rate of transfer of energy through a surface (e.g., measured in Joules per second (J·s$^{-1}$).

Since the blocks do not store any information regarding surrounding blocks, the power fluxes entering and leaving a block may only be functions of the temperatures of the block's nodes and an internal block temperature (e.g., if the block keeps track of the internal block temperature). This differs from the classical finite volume method in which power fluxes can be defined as functions of temperatures in several connected control volumes. In such situations, upwind power flux schemes may be the only option to model convective power fluxes. Upwind power flux occurs due to a temperature of a fluid exiting a block, and may have an effect on adjacent blocks.

To illustrate, consider two blocks (block I and block II) connected by a node (N). The convection power flux leaving block I may be determined by:

$$\Phi_{I \to N}^{convection} = \begin{Bmatrix} \dot{m} h_I, \dot{m} \geq 0 \text{ kg} \cdot s^{-1} \\ \dot{m} h_N, \dot{m} < 0 \text{ kg} \cdot s^{-1} \end{Bmatrix},$$

where " " may be a mass flow through the system and may be positive from block I to block II. The convection power flux leaving block II may be determined in a similar manner. The enthalpy (or temperature) at the node N may be determined by:

$$\Phi_{I \to N}^{convection} + \Phi_{II \to N}^{convection} = 0.$$

This may create a sudden discontinuity from the enthalpy at block I ($h_I$) to the enthalpy at block II ($h_{II}$) for the node enthalpy ($h_N$) as the mass flow changes sign (e.g., direction). The discontinuity may create a difficult non-linear system to solve since the mass flow is also a function of the temperature through the density. As the mass flow approaches zero, model solvers may need to iterate to find the final value of the node enthalpy. However, since the node enthalpy jumps suddenly from the block I enthalpy to the block II enthalpy, an undesirable numerical non-robustness is created. Furthermore, at sudden mass flow reversals, the node enthalpy may simply be non-defined.

Overview

Systems and/or methods described herein may model thermal fluid problems using the physical network approach, and may provide solutions to the thermal fluid problems that are physically correct, numerically robust, and easy to use. The systems and/or methods may give proper physical treatment to a node in a thermal fluid model so that the node enthalpy (or temperature) may not instantaneously jump from one block enthalpy to another block enthalpy. Such an arrangement may provide a simulation system that does not experience numerical issues.

FIG. 1 is a diagram of an overview of an example implementation described herein. As shown in FIG. 1, a physical network may be modeled in a thermal fluid model (e.g., by a technical computing environment (TCE)), and the thermal fluid model may be executed to generate a solution. The thermal fluid may include liquids, gases, two-phase flows, etc. In one example, the physical network may include a portion of a thermal hydraulics system that includes an orifice and a chamber. The thermal fluid model may include an algorithmic model, a block diagram model, etc. produced by the TCE. The thermal fluid model may include blocks, such as a first block (block I) and a second block (block II), interconnected by a node (N). An execution engine of the TCE may execute the thermal fluid model to produce the solution. Although FIG. 1 shows two blocks and a single node, in other implementations the thermal fluid model may include more than two blocks and more than one node.

The orifice may include an opening provided in a fluid conduit (e.g., a pipe), where a cross-sectional area of the opening is smaller than a cross-sectional area of the fluid conduit. Thus, the orifice may act to constrict fluid flow in the fluid conduit. As shown in FIG. 1, fluid within the orifice may include a volume ($V_1$) and an internal temperature ($T_{int1}$). Fluid at a first interface of the orifice may include a pressure ($p_1$) and a temperature ($T_1$). Fluid at a second interface of the orifice may include a pressure ($p_2$) and a temperature ($T_2$).

The chamber may include a compartment connected to the fluid conduit that may act as a reservoir for the fluid. As shown in FIG. 1, fluid within the chamber may include a volume ($V_2$) and an internal temperature ($T_{int2}$). Fluid at a first interface of the chamber may include a pressure ($p_2$) and a temperature ($T_2$). The first interface of the chamber may correspond to the second interface of the orifice. Fluid at a second interface of the chamber may include a pressure ($p_3$) and a temperature ($T_3$).

The first block may include a representation of the orifice of the physical network. A block may include a fundamental mathematical element of a block diagram model. The second block may include a representation of the chamber of the physical network. The node may include a mechanism that connects the first block and the second block of the thermal fluid model. The node may include a representation of the second interface of the orifice and the first interface of the chamber.

The execution engine may process the thermal fluid model to produce a simulation solution, may convert the thermal fluid model into executable code, and/or may perform other analyses and/or related tasks.

In one example implementation, the TCE may receive information associated with the physical network, such as the volume, temperature, pressure, etc. information associated with the orifice and the chamber. The TCE may create the thermal fluid model based on the information associated with the physical network. The execution engine may calculate convection power fluxes for the first block and the second block based on the physical network information, and may calculate conduction power fluxes for the first block and the second block based on the physical network information. The execution engine may combine the convection power flux and the conduction power flux for the first block to determine a power flux for the first block for all mass flows through the thermal fluid model. The execution engine may combine the convection power flux and the conduction power flux for the second block to determine a power flux for the second block for all mass flows through the thermal fluid model.

Alternatively, or additionally, the execution engine may determine a mass flow of the thermal fluid model based on the physical network information. For a low mass flow, the execution engine may calculate the conduction power fluxes for the first block and the second block based on the physical network information. Thus, for the low mass flow, the power fluxes for the first block and the second block may depend on a combination of the convection power fluxes and the conduction power fluxes. For a high mass flow, the execution engine may set the conduction power fluxes for the first block and the second block to zero. Thus, for the high mass flow, the power fluxes for the first block and the second block may depend solely on the convection power fluxes.

Example Environment Arrangement

Figure 2:
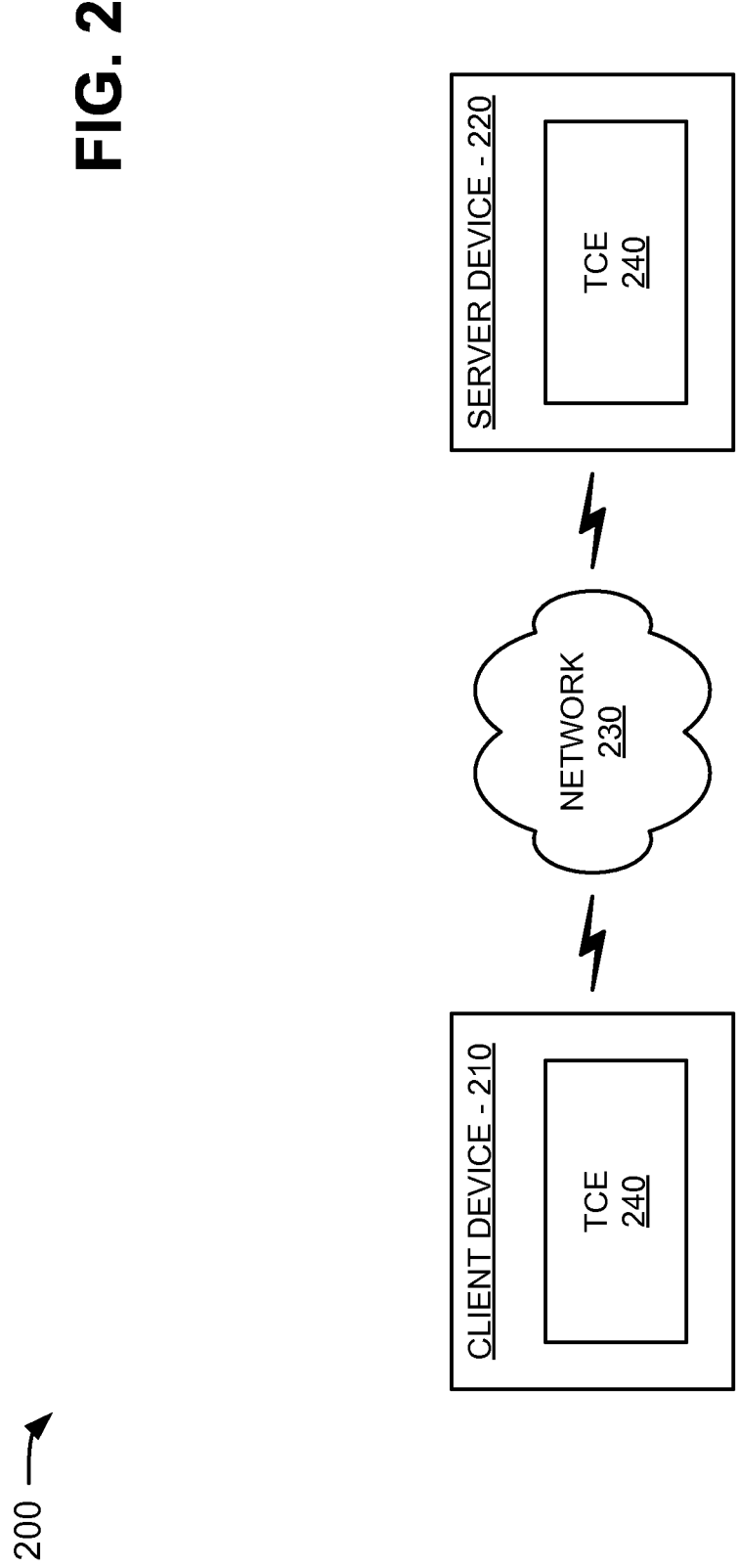
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations. For example, TCE 240 may use an array as a basic element, where the array may not require dimensioning. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
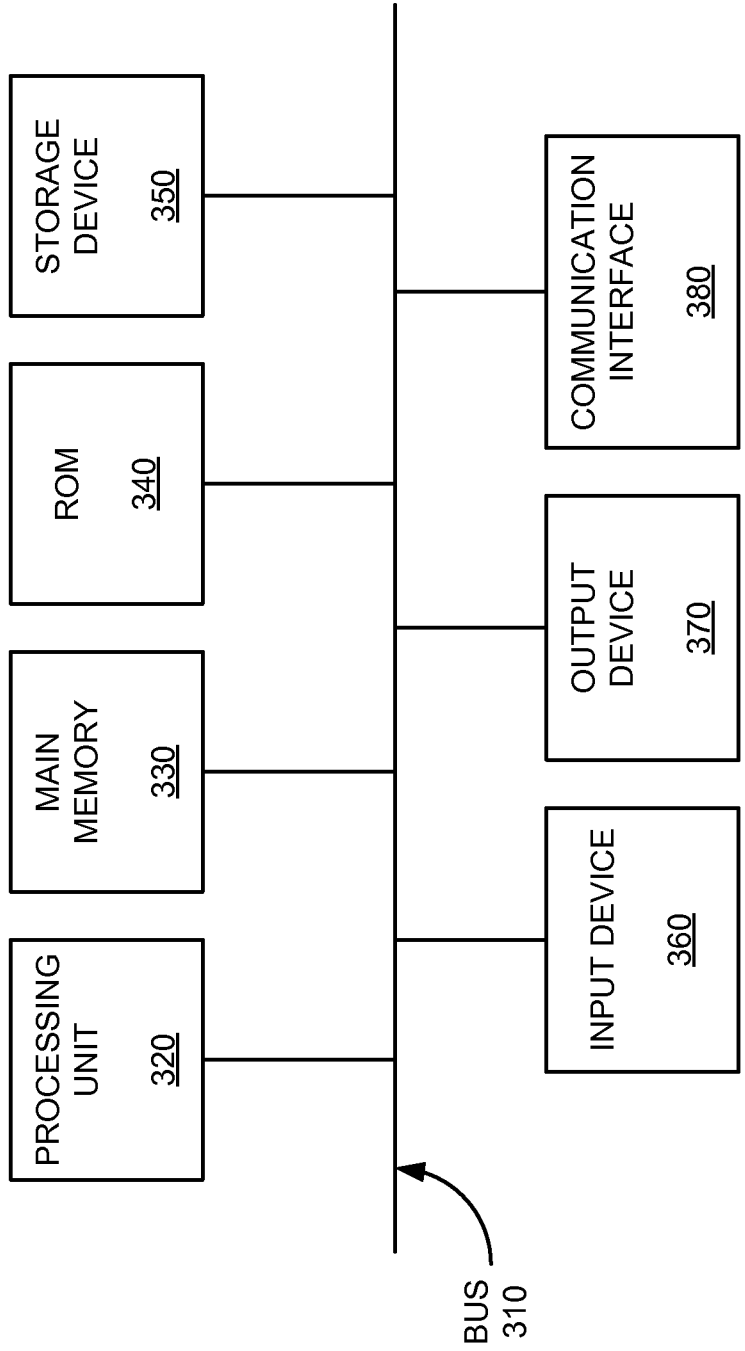
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
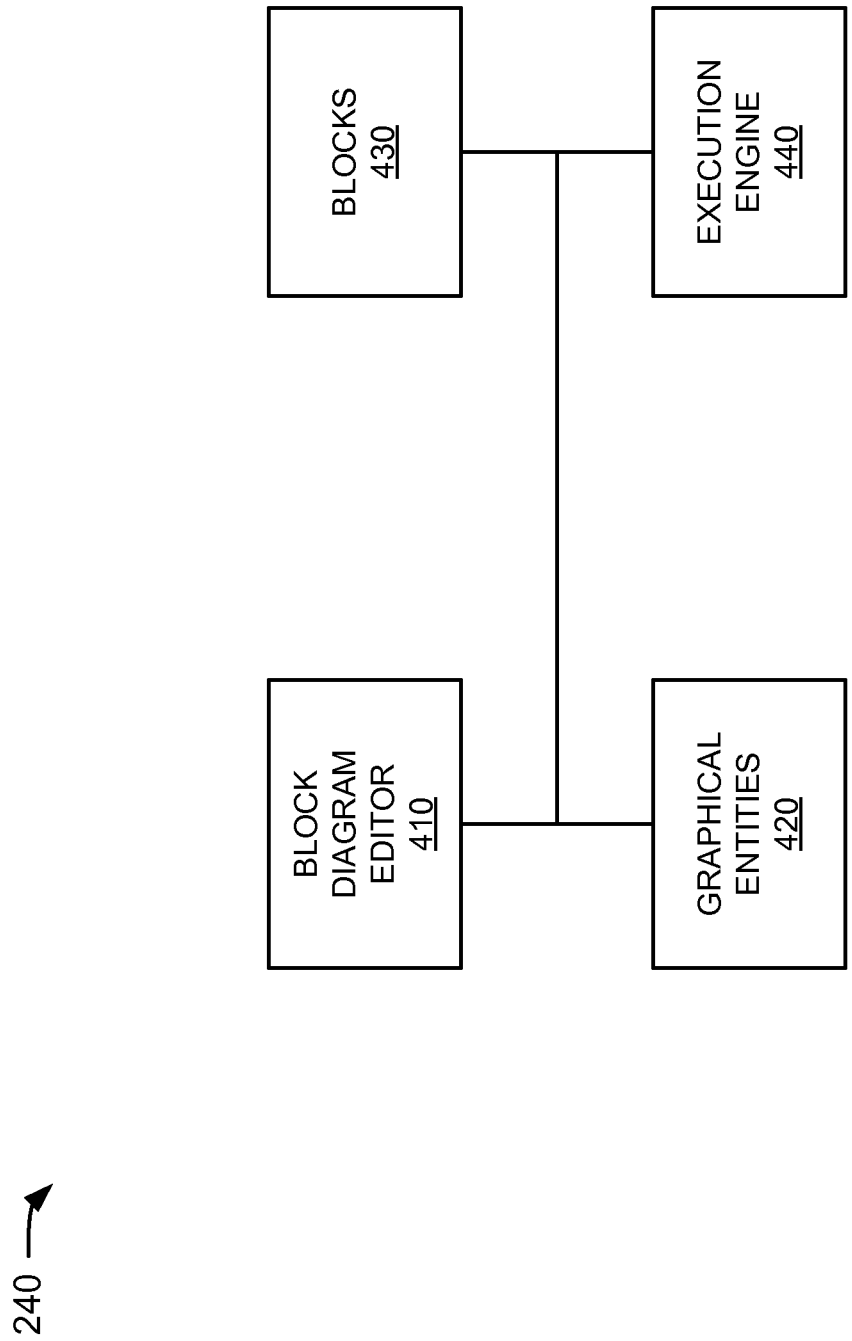
FIG. 4 is a diagram of example functional components of a technical computing environment (TCE) that may be used by one or more of the devices of the environment depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models may include entities with relationships between the entities, and the relationships and/or the entities may have attributes associated with them. The entities my include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model. For example, a graphical model may include a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

Figure 5:
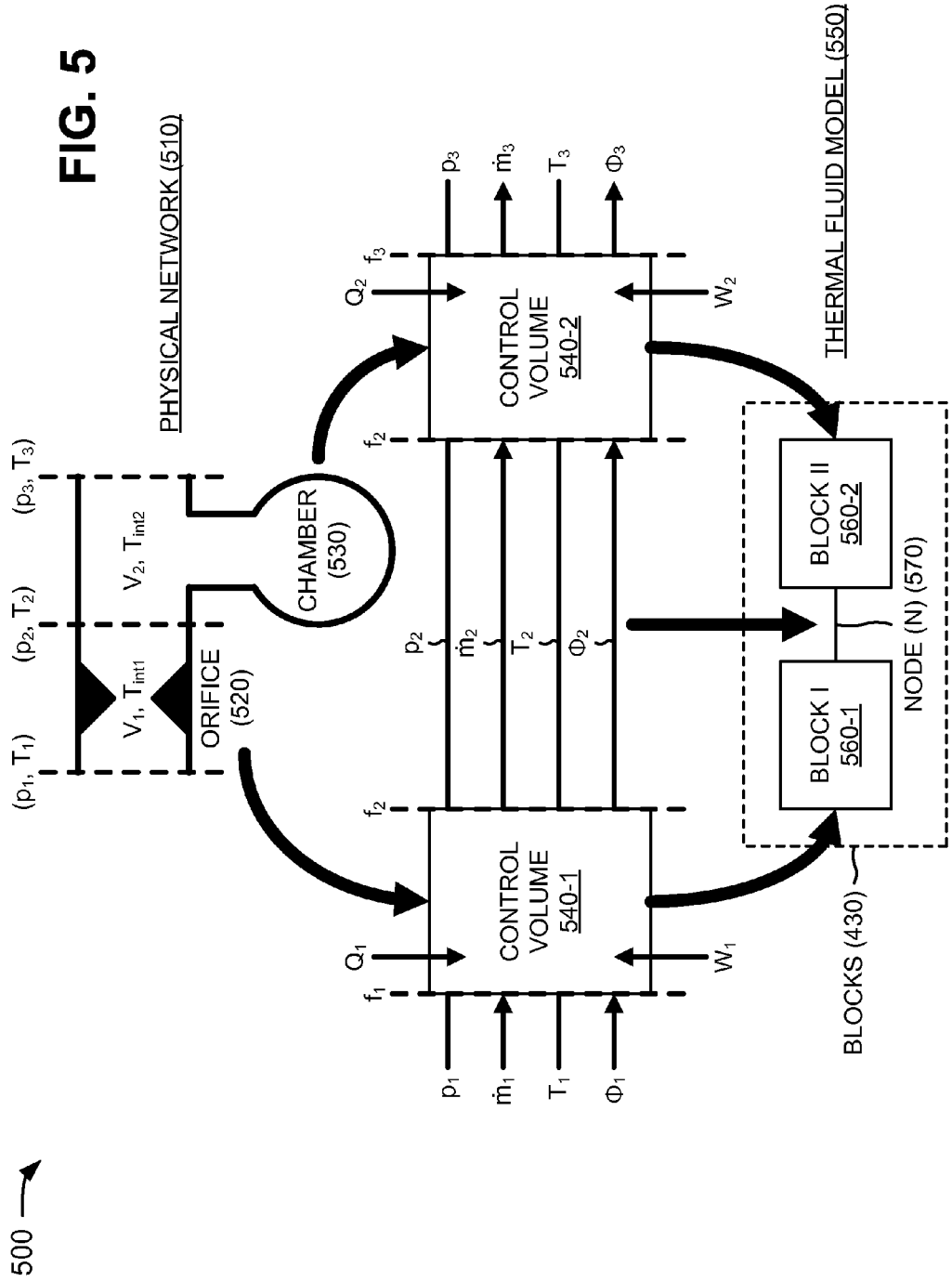
FIG. 5 is a diagram of example interactions between a physical network and a thermal fluid model capable of being generated by the TCE.

FIG. 5 is a diagram of example interactions 500 between a physical network and a thermal fluid model capable of being generated by TCE 240 (FIGS. 2 and 4). As shown in FIG. 5, a physical network 510 may include an orifice 520 and a chamber 530. TCE 240 may utilize information associated with physical network 510 to create control volumes 540-1 and 540-2 for orifice 520 and chamber 530, respectively. TCE 240 may utilize control volumes 540-1 and 540-2 to create a thermal fluid model 550. For example, TCE 240 may utilize control volumes 540-1 and 540-2 to create blocks 430, such as a first block (block I) 560-1 and a second block (block II) 560-2 interconnected by a node (N) 570. First block 560-1, second block 560-2, and node 570 may form thermal fluid model 550. Although FIG. 5 shows two blocks 560-1/560-2 and a single node 570, in other implementations thermal fluid model 550 may include more than two blocks and more than one node.

In one example, physical network 510 may include a portion of a thermal hydraulics system and/or other types of thermal fluid systems that include orifice 520 and chamber 530. Orifice 520 may include an opening provided in a fluid conduit (e.g., a pipe), where a cross-sectional area of the opening is smaller than a cross-sectional area of the fluid conduit. Thus, orifice 520 may act to constrict fluid flow in the fluid conduit. As shown in FIG. 5, fluid within orifice 520 may include a volume ($V_1$) and an internal temperature ($T_{int1}$). Fluid at a first interface of orifice 520 may include a pressure ($p_1$) and a temperature ($T_1$). Fluid at a second interface of orifice 520 may include a pressure ($p_2$) and a temperature ($T_2$).

Chamber 530 may include a compartment connected to the fluid conduit that may act as a reservoir for the fluid. As shown in FIG. 5, fluid within chamber 530 may include a volume ($V_2$) and an internal temperature ($T_{int2}$). Fluid at a first interface of chamber 530 may include a pressure ($p_2$) and a temperature ($T_2$). The first interface of chamber 530 may correspond to the second interface of orifice 520. Fluid at a second interface of chamber 530 may include a pressure ($p_3$) and a temperature ($T_3$).

Control volume 540-1 may include a representation of the fluid provided in orifice 520. Control volume 540-1 may include multiple interfaces, such as a first fluid interface ($f_1$), a second fluid interface ($f_2$), a heat transfer interface, a mechanical work interface, etc. The first fluid interface of control volume 540-1 may include fluid at a first pressure ($p_1$), a first mass flow ($m_1$), a first temperature ($T_1$), and a first power flux ($\Phi_1$). The second fluid interface of control volume 540-1 may include fluid at a second pressure ($p_2$), a second mass flow ($m_2$), a second temperature ($T_2$), and a second power flux ($\Phi_2$). The heat transfer interface of control volume 540-1 may include a power exchanged through heat transfer ($Q_1$), and the mechanical work interface of control volume 540-1 may include a power exchanged through mechanical work ($W_1$).

Control volume 540-2 may include a representation of the fluid provided in chamber 530. Control volume 540-2 may include multiple interfaces, such as the second fluid interface ($f_2$), a third fluid interface ($f_3$), a heat transfer interface, a mechanical work interface, etc. The second fluid interface of control volume 540-2 may include fluid at a second pressure ($p_2$), a second mass flow ($m_2$), a second temperature ($T_2$), and a second power flux ($\Phi_2$). The second fluid interface of control volume 540-2 may correspond to the second fluid interface of control volume 540-1. The third fluid interface of control volume 540-2 may include fluid at a third pressure ($p_3$), a third mass flow ($m_3$), a third temperature ($T_3$), and a third power flux ($\Phi_3$). The heat transfer interface of control volume 540-2 may include a power exchanged through heat transfer ($Q_2$), and the mechanical work interface of control volume 540-2 may include a power exchanged through mechanical work ($W_2$).

First block 560-1 may include a representation of orifice 520 of physical network 510, as defined by control volume 540-1. Thus, first block 560-1 may be associated with the pressures ($p_1$, $p_2$), the mass flows ($m_1$, $m_2$), the temperatures ($T_1$, $T_2$), the power fluxes ($\Phi_1$, $\Phi_2$), etc. associated with control volume 540-1.

Second block 560-2 may include a representation of chamber 530 of physical network 510, as defined by control volume 540-2. Thus, second block 560-2 may be associated with the pressures ($p_2$, $p_3$), the mass flows ($m_2$, $m_3$), the temperatures ($T_2$, $T_3$), the power fluxes ($\Phi_2$, $\Phi_3$), etc. associated with control volume 540-2.

Node 570 may include a mechanism that connects first block 560-1 and second block 560-2 of thermal fluid model 550. Node 570 may include a representation of the fluid outlet ($f_2$) of control volume 540-1 and/or of the fluid inlet ($f_2$) of control volume 540-2. Thus, node 570 may be associated with the pressure ($p_2$), the mass flow ($m_2$), the temperature ($T_2$), and the power flux ($\Phi_2$), etc. associated with the fluid outlet/inlet ($f_2$).

In one example implementation, TCE 240 may receive information associated with physical network 510, such as the volume, temperature, pressure, etc. information associated with orifice 520 and chamber 530. TCE 240 may create thermal fluid model 550 based on the information associated with physical network 510. In one example, TCE 240 may first create control volumes 540-1 and 540-2 based on the information associated with physical network 510. Additionally, or alternatively, TCE 240 may then create thermal fluid model 550 based on the created control volumes 540-1 and 540-2.

Although FIG. 5 shows example components capable of being generated by TCE 240, in other implementations, TCE 240 may generate fewer components, different components, differently arranged components, and/or additional components than depicted in FIG. 5. Alternatively, or additionally, one or more components of FIG. 5 may perform one or more other tasks described as being performed by one or more other components of FIG. 5.

FIG. 6 is a diagram of further example interactions 600 between physical network 510 and thermal fluid model 550. As shown in FIG. 6, physical network 510 may include orifice 520 and chamber 530, and thermal fluid model 550 may include blocks 430, first block 560-1, second block 560-2, and node 570. Thermal fluid model 550 may be provided to execution engine 440 (of TCE 240) for execution. Blocks 430, execution engine 440, physical network 510, orifice 520, chamber 530, first block 560-1, second block 560-2, and node 570 may include the features described above in connection with one or more of, for example, FIGS. 1-5.

As further shown in FIG. 6, physical network 510 may be modeled in thermal fluid model 550 (e.g., by TCE 240), and thermal fluid model 550 may be executed, by execution engine 440, to generate a solution 610. Execution engine 440 may process thermal fluid model 550 to produce solution 610, may convert thermal fluid model 550 into executable code, and/or may perform other analyses and/or related tasks. Execution engine 440 may output solution 610 to a user of TCE 240 (e.g., via a display of client device 210), and/or may store solution 610 (e.g., in a memory associated with client device 210).

In one example implementation, execution engine 440 may calculate convection power fluxes for first block 560-1 and second block 560-2 based on information associated with physical network 510 (e.g., the volume, temperature, pressure, etc. associated with orifice 520 and chamber 530), and may calculate conduction power fluxes for first block 560-1 and second block 560-2 based on the information associated with physical network 510. Execution engine 440 may combine the convection power flux and the conduction power flux for first block 560-1 to determine a power flux for first block 560-1 for all mass flows of thermal fluid model 550, as indicated by reference number 620. Execution engine 440 may combine the convection power flux and the conduction power flux for second block 560-2 to determine a power flux for second block 560-2 for all mass flows of thermal fluid model 550, as further indicated by reference number 620. A convection power flux may include an energy flow carried by a fluid flow. A conduction power flux may include an energy flow that is independent of a fluid flow and is due to a temperature gradient.

Alternatively, or additionally, execution engine 440 may determine a mass flow of thermal fluid model 550 based on the information associated with physical network 510. For a low mass flow, execution engine 440 may calculate the conduction power fluxes for first block 560-1 and second block 560-2 based on the information associated with physical network 510. Thus, for the low mass flow, the power fluxes for first block 560-1 and second block 560-2 may depend on a combination of the convection power fluxes and the conduction power fluxes, as indicated by reference number 630. A low mass flow may occur when a flow of a fluid mass approaches zero, such as when a Peclet number (Pe) associated with the fluid mass is: $-2 \leq Pe \leq 2$. A Peclet number is a dimensionless number provided by a ratio of thermal convection over thermal conduction.

For a high mass flow, execution engine 440 may set the conduction power fluxes for first block 560-1 and second block 560-2 to zero. A high mass flow may occur when a Peclet number (Pe) associated with the fluid mass is: $Pe < -2$ or $Pe > 2$. Thus, for the high mass flow, the power fluxes for first block 560-1 and second block 560-2 may depend solely on the convection power fluxes, as further indicated by reference number 630.

In one example implementation, execution engine 440 may rely on the additive modeling of conductive heat transfer in power fluxes to produce a continuous physical behavior of the temperature of node 570 at low mass flows. The conductive heat transfer may be negligible in purely convective systems, but may be comparable to convective heat transfer at low mass flows. The conductive heat transfer may be modeled based on characteristics associated with components of physical network 510. In one example, execution engine 440 may determine power fluxes for first block 560-1 $\Phi_I$ ($\Phi_{I \to N}$) and second block 560-2 ($\Phi_{II \to N}$) based on the following:

$$\Phi_{I \to N} = \Phi_{I \to N}^{convection} + \Phi_{I \to N}^{conduction}$$

$$\Phi_{II \to N} = \Phi_{II \to N}^{convection} + \Phi_{II \to N}^{conduction}.$$

Execution engine 440 may determine the conduction power fluxes for first block 560-1 and second block 560-2 based on the following:

$$\Phi_{I \to N}^{conduction} = G_{th}^{I}(T_I - T_N)$$

$$\Phi_{II \to N}^{conduction} = G_{th}^{II}(T_{II} - T_N),$$

where $G_{th}^{I}$ may be a thermal conductance of first block 560-1, $G_{th}^{II}$ may be a thermal conductance of second block 560-2, $T_I$ may be an internal temperature of first block 560-1, $T_{II}$ may be an internal temperature of second block 560-2, and $T_N$ may be a temperature at node 570. The conduction power fluxes may be indifferent to the sign of the mass flow through thermal fluid model 550, and may be unchanged with regards to the convection power fluxes for first block 560-1 and second block 560-2. The temperature at node 570 ($T_N$) may be continuous for all mass flows through thermal fluid model 550.

Conventional computational fluid dynamics (CFD) solvers are different than physical network-based flow solvers described herein. For example, for CFD solvers, each control volume of a system may have direct access to information stored inside other control volumes of the system, and power fluxes may be expressed as functions of internal variables of several control volumes. In contrast, since blocks, in a physical network-based system described herein, do not store any information regarding surrounding blocks, the power fluxes entering and leaving a block may only be functions of the through and across variables associated with the nodes, as well as the internal block variables.

Some conventional physical network-based flow solvers utilize a stream theory or pure upwinding for physical networks. Both the stream theory solvers and the pure upwinding solvers only take into account convective heat transfer effects and do not take into account conductive heat transfer.

In contrast, systems and/or methods described herein may provide thermal fluid modeling using the physical network approach and where convection and conduction power fluxes are combined. The systems and/or methods may provide fluid energy conduction, along a direction where fluid can flow, and may combine the fluid energy conduction with the fluid energy convection. The systems and/or methods may provide smooth transitions for temperatures of nodes (e.g., node 570) provided between blocks 430 (e.g., first block 560-1 and second block 560-2), may provide solution 610 that is numerically robust, may permit combinations of blocks 430 without special rules or additional calculations, etc. In one implementation, the systems and/or methods may combine a convection power flux and a conduction power flux for a block to determine a power flux for the block for all mass flows. Alternatively, or additionally, for low mass flow, a power flux for a block may depend on a combination of a convection power flux and a conduction power flux for the block. For high mass flow, a power flux for a block may depend solely on a convection power flux for the block.

Although FIG. 6 shows example components capable of being generated by TCE 240, in other implementations, TCE 240 may generate fewer components, different components, differently arranged components, and/or additional components than depicted in FIG. 6. Alternatively, or additionally, one or more components of FIG. 6 may perform one or more other tasks described as being performed by one or more other components of FIG. 6.

Example Functional Components of Technical Computing Environment

Figure 7:
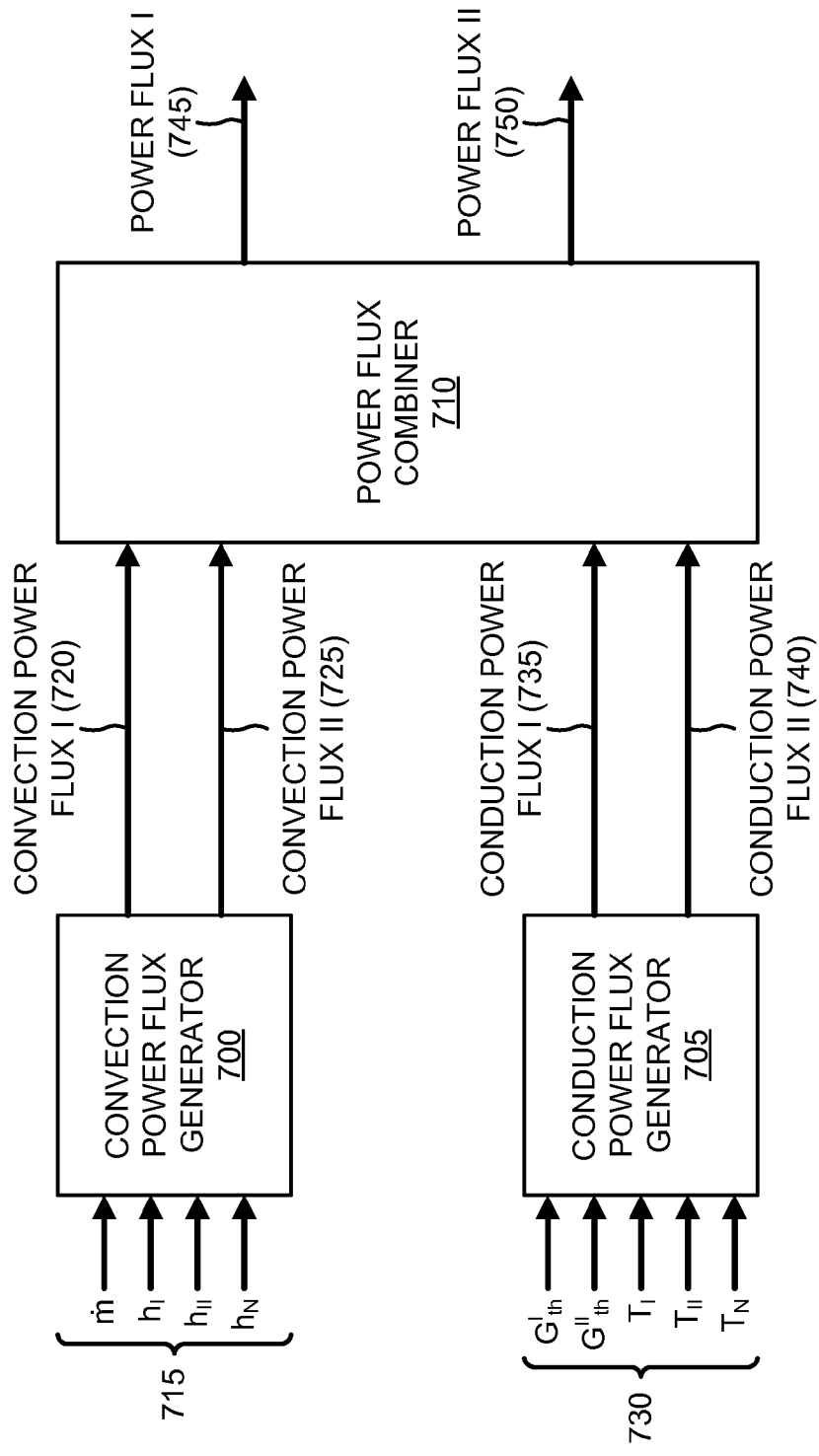
FIG. 7 is a diagram of example functional components of the TCE.

FIG. 7 is a diagram of example functional components of TCE 240. In one implementation, the functions described in connection with FIG. 7 may be performed by one or more components of device 300 (FIG. 3) and/or by one or more devices 300. As shown in FIG. 7, TCE 240 may include a convection power flux generator 700, a conduction power flux generator 705, and a power flux combiner 710.

Convection power flux generator 700 may receive a variety of information 715 associated with thermal fluid model 550. Information 715 may include, for example, a mass flow ( ) associated with thermal fluid model 550, an enthalpy ($h_I$) of first block 560-1, an enthalpy ($h_{II}$) of second block 560-2, and an enthalpy ($h_N$) of node 570. Convection power flux generator 700 may calculate a convection power flux 720 associated with first block 560-1 based on information 715. For example, convection power flux generator 700 may calculate convection power flux 720 ($\Phi_{I \to N}^{convection}$) as follows:

$$\Phi_{I \to N}^{convection} = \begin{Bmatrix} \dot{m} h_I, \dot{m} \geq 0 \text{ kg} \cdot s^{-1} \\ \dot{m} h_N, \dot{m} < 0 \text{ kg} \cdot s^{-1} \end{Bmatrix}.$$

Convection power flux generator 700 may calculate a convection power flux 725 associated with second block 560-2 based on information 715. For example, convection power flux generator 700 may calculate convection power flux 725 ($\Phi_{II \to N}^{convection}$) as follows:

$$\Phi_{II \to N}^{convection} = \begin{Bmatrix} -\dot{m} h_N, \dot{m} \geq 0 \text{ kg} \cdot s^{-1} \\ -\dot{m} h_{II}, \dot{m} < 0 \text{ kg} \cdot s^{-1} \end{Bmatrix}.$$

Convection power flux generator 700 may provide convection power flux 720 and convection power flux 725 to power flux combiner 710.

Conduction power flux generator 705 may receive a variety of information 730 associated with thermal fluid model 550. Information 730 may include, for example, a thermal conductance ($G^I_{th}$) of first block 560-1, a thermal conductance ($G^{II}_{th}$) of second block 560-2, a temperature ($T_I$) of first block 560-1, a temperature ($T_{II}$) of second block 560-2, and a temperature ($T_N$) of node 570. Conduction power flux generator 705 may calculate a conduction power flux 735 associated with first block 560-1 based on information 730. For example, conduction power flux generator 705 may calculate conduction power flux 735 ($\Phi_{I \to N}^{conduction}$) as follows:

$$\Phi_{I \to N}^{conduction} = G^I_{th}(T_I - T_N).$$

Conduction power flux generator 705 may calculate a conduction power flux 740 associated with second block 560-2 based on information 730. For example, conduction power flux generator 705 may calculate conduction power flux 740 ($\Phi_{II \to N}^{conduction}$) as follows:

$$\Phi_{II \to N}^{conduction} = G^{II}_{th}(T_{II} - T_N).$$

Conduction power flux generator 705 may provide conduction power flux 735 and conduction power flux 740 to power flux combiner 710.

Power flux combiner 710 may receive convection power flux 720 and convection power flux 725 from convection power flux generator 700, and may receive conduction power flux 735 and conduction power flux 740 from conduction power flux generator 705. Power flux combiner 710 may combine convection power flux 720 with conduction power flux 735 to obtain a power flux 745 for first block 560-1. For example, power flux combiner 710 may calculate power flux 745 ($\Phi_{I \to N}$) as follows:

$$\Phi_{I \to N} = \Phi_{I \to N}^{convection} + \Phi_{I \to N}^{conduction}.$$

Power flux combiner 710 may combine convection power flux 725 with conduction power flux 740 to obtain a power flux 750 for second block 560-2. For example, power flux combiner 710 may calculate power flux 750 ($\Phi_{II \to N}$) as follows:

$$\Phi_{II \to N} = \Phi_{II \to N}^{convection} + \Phi_{II \to N}^{conduction}.$$

In one example implementation, power flux combiner 710 may add conduction power flux 735 to convection power flux 720 for all mass flows, and may add conduction power flux 740 to convection power flux 725 for all mass flows. Convection power fluxes 720 and 725 may be expressed using an upwind formulation. Conduction power fluxes 735 and 740 may be modeled using a thermal resistance network based on geometries of components of physical network 510. Each of blocks 560-1 and 560-2 may include an internal temperature (e.g., temperature ($T_I$) of first block 560-1 and a temperature ($T_{II}$) of second block 560-2).

In one example, power flux combiner 710 may enforce a limitation on power flux ($\Phi_{I \to N}$) 745 and power flux ($\Phi_{II \to N}$) 750 as follows:

$$\Phi_{I \to N} + \Phi_{II \to N} = 0.$$

Figure 8:
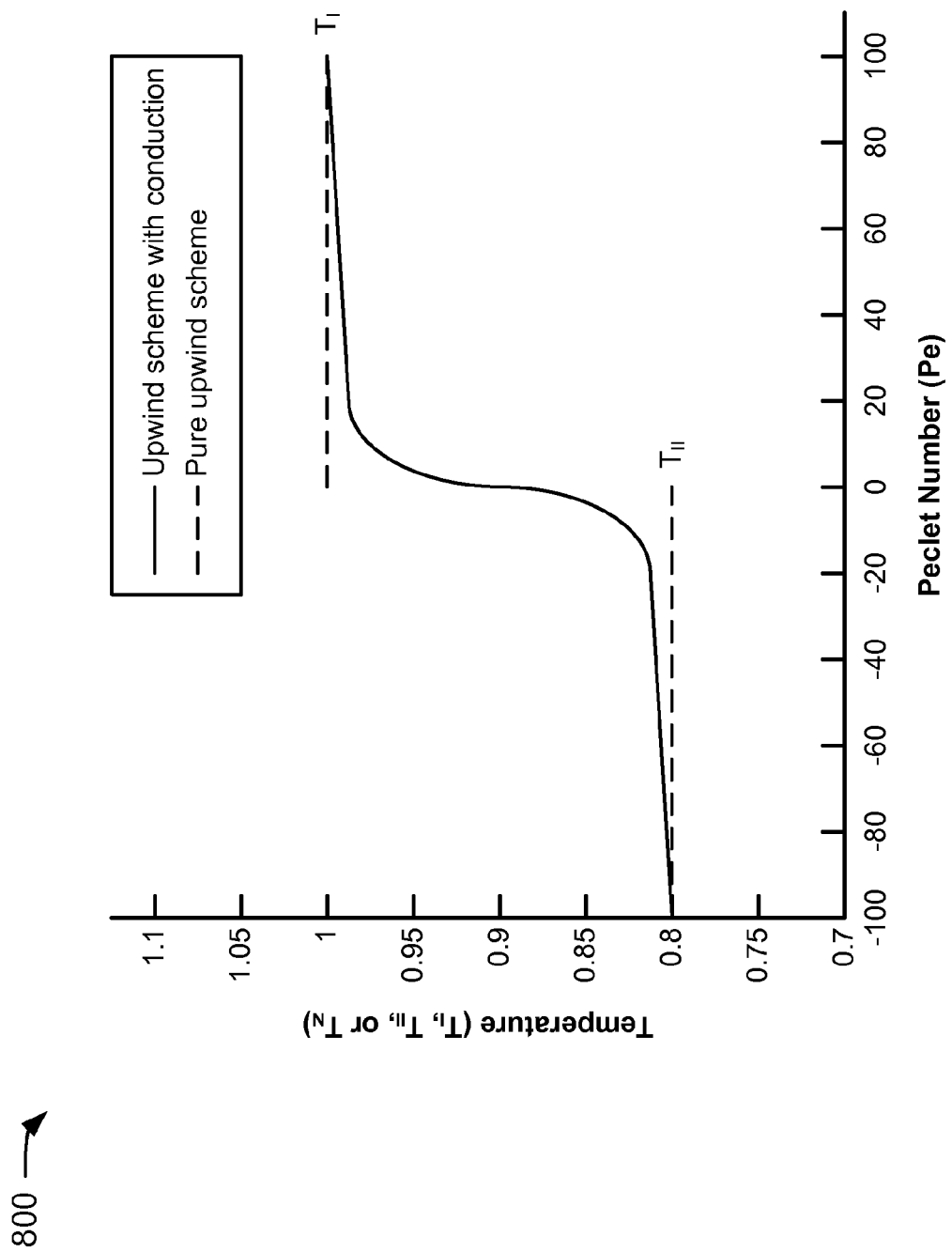
FIG. 8 is a graph depicting a solution generated by the functional components of the TCE shown in FIG. 7.

The solution to this equation may be illustrated as a graph 800 depicted in FIG. 8. As shown in graph 800, a temperature of node 570 may smoothly transition from a temperature ($T_I$) of first block 560-1 to a temperature ($T_{II}$) of second block 560-2, as indicated by the solid line in FIG. 8 (e.g., the line represented by an upwind scheme with conduction). A Peclet number (Pe) on graph 800 may be calculated by:

$$Pe = \frac{\dot{m} c_v}{G_{th}^I} = \frac{\text{convection}}{\text{conduction}},$$

where " " is a mass flow and is a specific heat, and where Pe may quantify the relationship between convection and conduction. For the example graph 800 of FIG. 8, an enthalpy (h) or temperature may be expressed as an enthalpy associated with perfect gases:

$$h = c_p T,$$

where $c_p$ may be a specific caloric capacity at constant pressure. Alternatively, the enthalpy (h) may be determined by a different expression or by a table lookup based on fluid type. Furthermore, for example graph 800, it may be assumed that $T_I = 1$, $T_{II} = 0.8$, and $G_{th}^I / G_{th}^{II} = 2$.

The solid line of FIG. 8 (e.g., the line represented by an upwind scheme with conduction) shows a smooth transition from the temperature ($T_I$) of first block 560-1 to the temperature ($T_{II}$) of second block 560-2, based on the sign of the mass flow. This may enable thermal fluid model 550 to be a solvable singularity-free system. In contrast, the dashed lines of FIG. 8 (e.g., the lines represented by a pure upwind scheme) show a discontinuity that may occur from temperature ($T_I$) of first block 560-1 to the temperature ($T_{II}$) of second block 560-2 for node 570 as the mass flow changes sign (e.g., direction). The discontinuity may create a difficult non-linear system to solve since the mass flow is also a function of the temperature through the density.

Although FIG. 7 shows example functional components of TCE 240, in other implementations, TCE 240 may include fewer functional components, different functional components, differently arranged functional components, and/or additional functional components than those depicted in FIG. 7. Alternatively, or additionally, one or more functional components of TCE 240 may perform one or more other tasks described as being performed by one or more other functional components of TCE 240.

Figure 9:
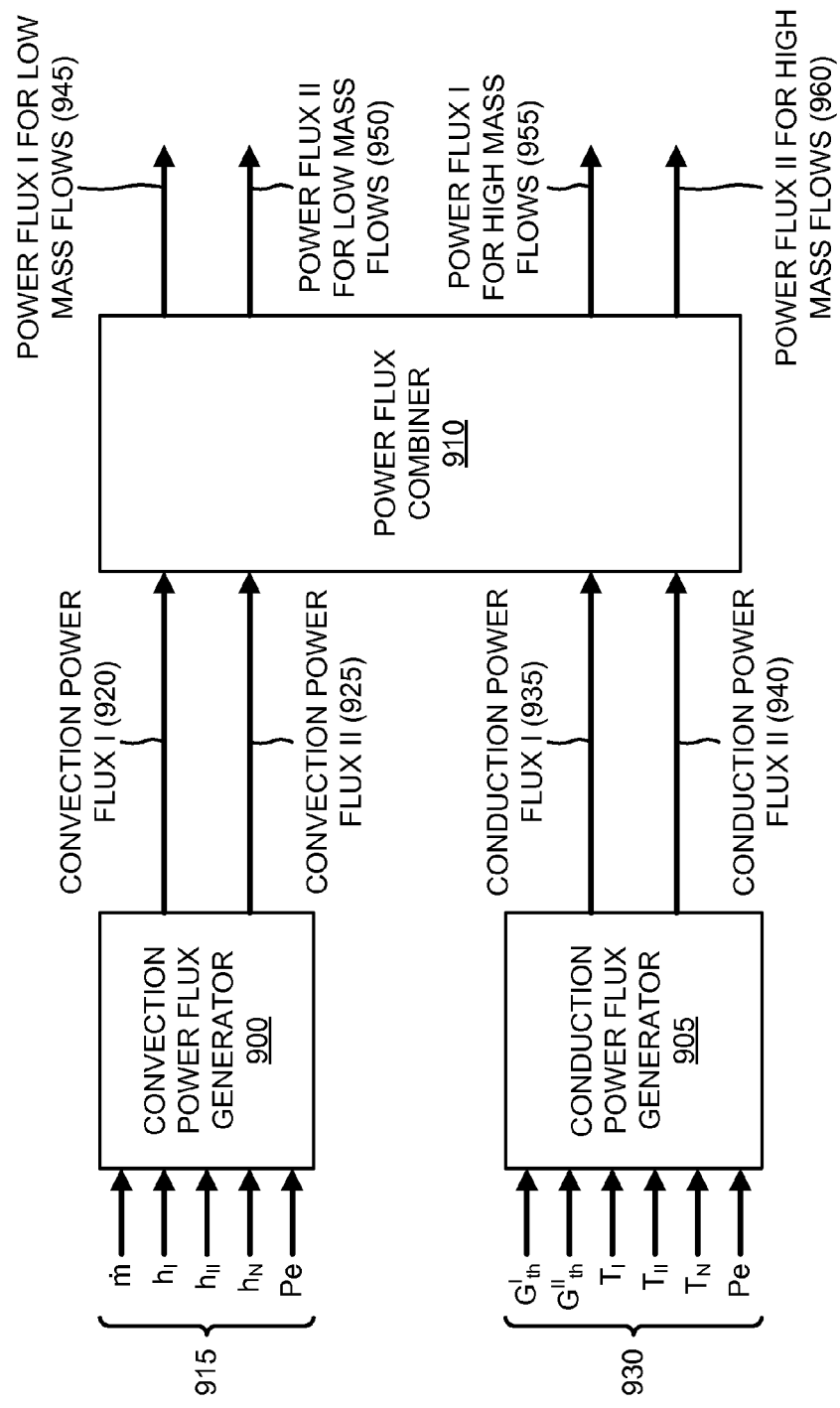
FIG. 9 is a diagram of additional functional components of the TCE.

FIG. 9 is a diagram of additional functional components of TCE 240. In one implementation, the functions described in connection with FIG. 9 may be performed by one or more components of device 300 (FIG. 3) and/or by one or more devices 300. As shown in FIG. 9, TCE 240 may include a convection power flux generator 900, a conduction power flux generator 905, and a power flux combiner 910.

Convection power flux generator 900 may receive a variety of information 915 associated with thermal fluid model 550. Information 915 may include, for example, a mass flow ( ) associated with thermal fluid model 550, an enthalpy ($h_I$) of first block 560-1, an enthalpy ($h_{II}$) of second block 560-2, an enthalpy ($h_N$) of node 570, and a Peclet number (Pe) associated with thermal fluid model 550. Convection power flux generator 900 may calculate a convection power flux 920 associated with first block 560-1 based on information 915. For example, convection power flux generator 900 may calculate convection power flux 920 ($\Phi_{I \to N}^{convection}$) as follows:

$$\Phi_{I \to N}^{convection}(Pe) = \left\{ \begin{array}{l} \dot{m} h_I, \, Pe < 2 \\ \dot{m} h_N, \, Pe \le 2 \end{array} \right\}.$$

Convection power flux generator 900 may calculate a convection power flux 925 associated with second block 560-2 based on information 915. For example, convection power flux generator 900 may calculate convection power flux 925 ($\Phi_{II \to N}^{convection}$) as follows:

$$\Phi_{II \to N}^{convection}(Pe) = \left\{ \begin{array}{l} \dot{m} h_N, \, Pe \ge -2 \\ \dot{m} h_{II}, \, Pe < -2 \end{array} \right\}.$$

Convection power flux generator 900 may provide convection power flux 920 and convection power flux 925 to power flux combiner 910.

Conduction power flux generator 905 may receive a variety of information 930 associated with thermal fluid model 550. Information 930 may include, for example, a thermal conductance ($G_{th}^I$) of first block 560-1, a thermal conductance ($G_{th}^{II}$) of second block 560-2, a temperature ($T_I$) of first block 560-1, a temperature ($T_{II}$) of second block 560-2, a temperature ($T_N$) of node 570, and a Peclet number (Pe) associated with thermal fluid model 550. Conduction power flux generator 905 may calculate a conduction power flux 935 associated with first block 560-1 based on information 930. For example, conduction power flux generator 905 may calculate conduction power flux 935 ($\Phi_{I \to N}^{conduction}$) as follows:

$$\Phi_{I \to N}^{conduction}(Pe) = G_{th}^I(Pe)(T_I - T_N).$$

Conduction power flux generator 905 may calculate a conduction power flux 940 associated with second block 560-2 based on information 930. For example, conduction power flux generator 905 may calculate conduction power flux 940 ($\Phi_{II \to N}^{conduction}$) as follows:

$$\Phi_{II \to N}^{conduction}(Pe) = G_{th}^{II}(Pe)(T_{II} - T_N).$$

Conduction power flux generator 905 may provide conduction power flux 935 and conduction power flux 940 to power flux combiner 910.

Power flux combiner 910 may receive convection power flux 920 and convection power flux 925 from convection power flux generator 900, and may receive conduction power flux 935 and conduction power flux 940 from conduction power flux generator 905. For low mass flows (e.g., for $-2 \le Pe \le 2$), power flux combiner 910 may combine convection power flux 920 with conduction power flux 935 to obtain a power flux 945 for first block 560-1 for low mass flows. For example, power flux combiner 910 may calculate power flux 945 ($\Phi_{I \to N}$) as follows:

$$\Phi_{I \to N}(Pe) = \Phi_{I \to N}^{convection}(Pe) + \Phi_{I \to N}^{conduction}(Pe).$$

For low mass flows (e.g., for $-2 \leq Pe \leq 2$), power flux combiner 910 may combine convection power flux 925 with conduction power flux 940 to obtain a power flux 950 for second block 560-2 for low mass flows. For example, power flux combiner 910 may calculate power flux 950 ($\Phi_{II \to N}$) as follows:

$$\Phi_{II \to N}(Pe) = \Phi_{II \to N}^{convection}(Pe) + \Phi_{II \to N}^{conduction}(Pe).$$

For high mass flows (e.g., for $Pe < -2$ or $Pe > 2$), power flux combiner 910 may set conduction power flux 935 to zero, and may utilize convection power flux 920 as a power flux 955 for first block 560-1 for high mass flows. For example, power flux combiner 910 may calculate power flux 955 ($\Phi_{I \to N}$) as follows:

$$\Phi_{I \to N}(Pe) = \Phi_{I \to N}^{convection}(Pe).$$

For high mass flows (e.g., for $Pe < -2$ or $Pe > 2$), power flux combiner 910 may set conduction power flux 940 to zero, and may utilize convection power flux 925 as a power flux 960 for second block 560-2 for high mass flows. For example, power flux combiner 910 may calculate power flux 960 ($\Phi_{II \to N}$) as follows:

$$\Phi_{II \to N}(Pe) = \Phi_{II \to N}^{convection}(Pe).$$

In one example implementation, power flux combiner 910 may implement a hybrid strategy depending on the mass flows through thermal fluid model 550. For high mass flows (e.g., for $Pe < -2$ or $Pe > 2$), power flux combiner 910 may set conduction power flux 935 and conduction power flux 940 to zero, and may utilize an upwind formulation (e.g., convection power flux 920 and convection power flux 925) to calculate power flux 955 and power flux 960. For low mass flows (e.g., for $-2 \leq Pe \leq 2$), power flux combiner 910 may utilize a linear blending between the upwind formulation (e.g., convection power flux 920 and convection power flux 925) and conduction power fluxes 935 and 940 to calculate power flux 945 and power flux 950. In one example, power flux combiner 910 may increase a thermal resistance of second block 560-2 back to a nominal value in order to perform the linear blending. Conduction power fluxes 935 and 940 may be modeled using a thermal resistance network based on geometries of components of physical network 510. Each of blocks 560-1 and 560-2 may include an internal temperature (e.g., temperature ($T_I$) of first block 560-1 and a temperature ($T_{II}$) of second block 560-2).

Figure 10:
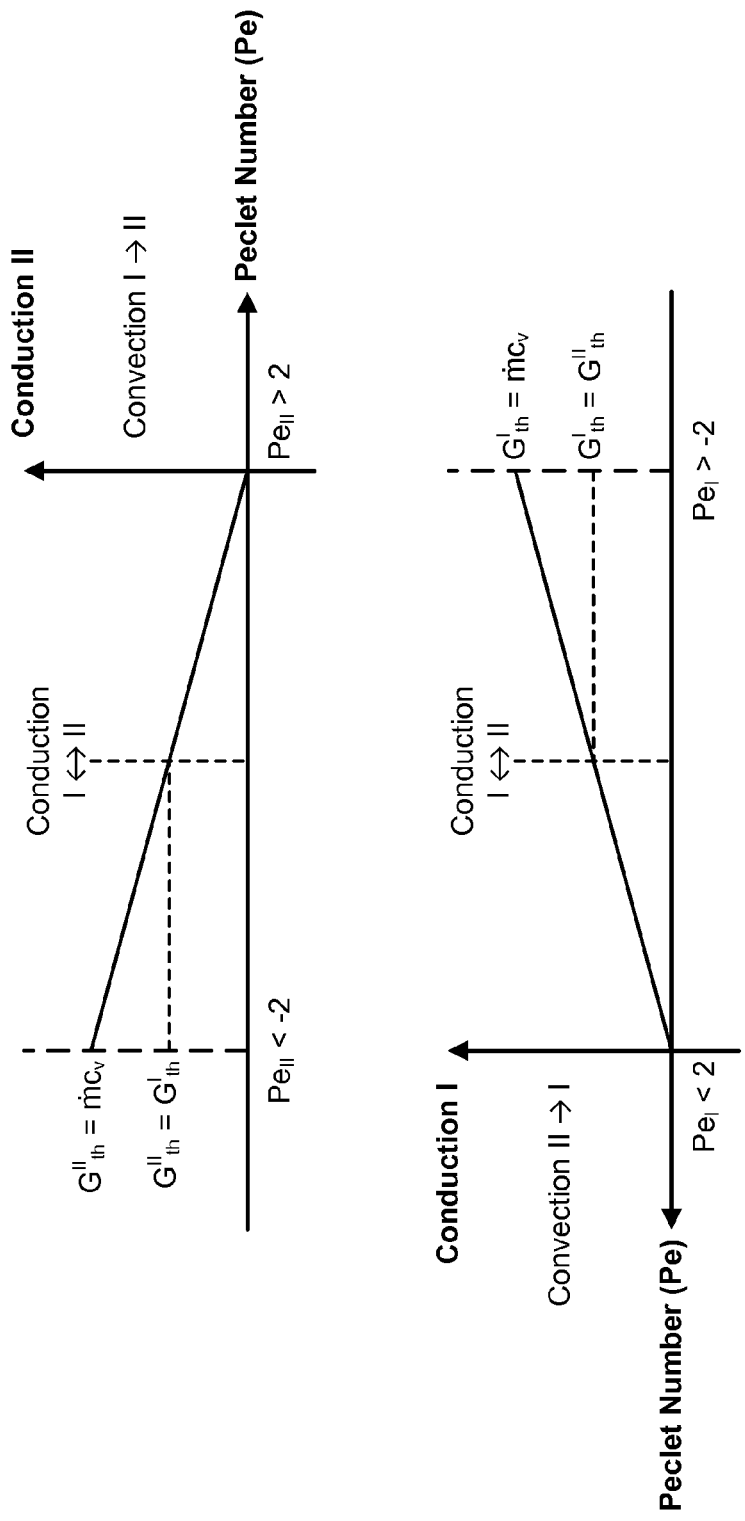
FIG. 10 are graphs depicting a solution generated by the additional functional components of the TCE shown in FIG. 9.

In one example implementation, power combiner 910 may perform the linear blending as illustrated in graphs 1000 of FIG. 10. As shown in graphs 1000, when the Peclet number (Pe) is equal to $-2$ or $2$, the temperature ($T_N$) of node 570 may be calculated as follows:

$$T_N(Pe) = \frac{G_{th}^I(Pe)T_I + G_{th}^{II}(Pe)T_{II}}{G_{th}^I(Pe) + G_{th}^{II}(Pe)}.$$

At zero mass flow (e.g., $Pe=0$), the temperature ($T_N$) of node 570 may be a classic thermal resistance result. As the Peclet number (Pe) moves away from zero and toward 2, the thermal conductance ($G_{th}^{II}$) of second block 560-2 goes to zero and the thermal conductance ($G_{th}^I$) of first block 560-1 goes to: $G_{th}^I(Pe=2) = 2G_{th}^I = mc_v$, where $c_v$ is a specific heat of first block 560-1. As further shown in FIG. 10, for low mass flows (e.g., for $-2 \leq Pe \leq 2$), power flux combiner 910 may provide some combination of convection power flux 920 and conduction power flux 935 to obtain power flux 945 for first block 560-1. For low mass flows (e.g., for $-2 \leq Pe \leq 2$), power flux combiner 910 may provide some combination of convection power flux 925 and conduction power flux 940 to obtain power flux 950 for second block 560-2.

Although FIG. 9 shows example functional components of TCE 240, in other implementations, TCE 240 may include fewer functional components, different functional components, differently arranged functional components, and/or additional functional components than those depicted in FIG. 9. Alternatively, or additionally, one or more functional components of TCE 240 may perform one or more other tasks described as being performed by one or more other functional components of TCE 240.

Example Processes

Figure 11:
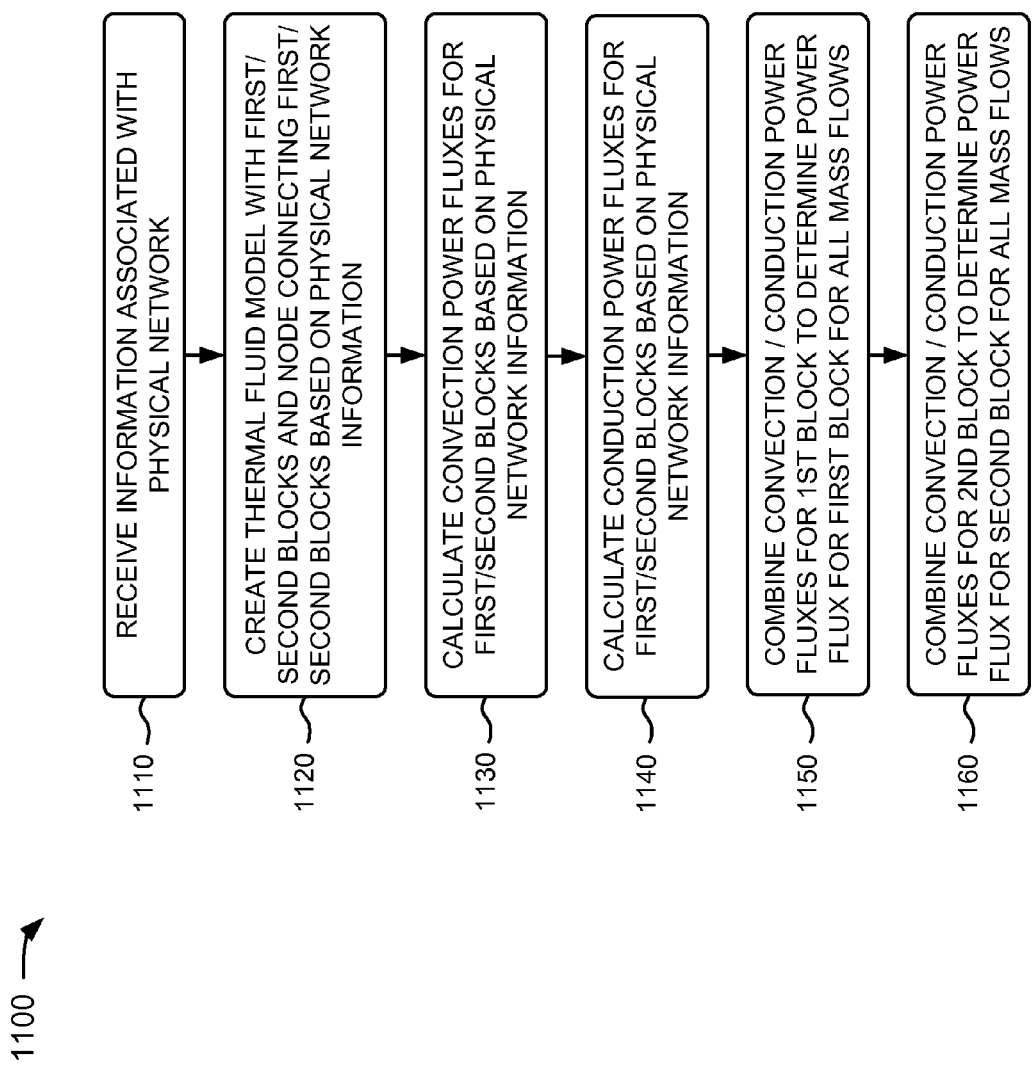
FIG. 11 is a flow chart of an example process for thermal fluid modeling with a physical network approach and using conduction and convection.

FIG. 11 is a flow chart of an example process 1100 for thermal fluid modeling with a physical network approach and using conduction and convection. In one implementation, process 1100 may be performed by client device 210/TCE 240. Alternatively, or additionally, process 1100 may be performed by another device or a group of devices separate from or including client device 210/TCE 240.

As shown in FIG. 11, process 1100 may include receiving information associated with a physical network (block 1110), and creating a thermal fluid model, with first and second blocks and a node connecting the first and second blocks, based on the physical network information (block 1120). For example, in an implementation described above in connection with FIG. 5, TCE 240 may utilize information associated with physical network 510 to create control volumes 540-1 and 540-2 for orifice 520 and chamber 530, respectively. TCE 240 may utilize control volumes 540-1 and 540-2 to create thermal fluid model 550. For example, TCE 240 may utilize control volumes 540-1 and 540-2 to create blocks 430, such as first block (block I) 560-1 and second block (block II) 560-2 interconnected by node (N) 570. First block 560-1, second block 560-2, and node 570 may form thermal fluid model 550.

As further shown in FIG. 11, process 1100 may include calculating convection power fluxes for the first and second blocks based on the physical network information (block 1130), and calculating conduction power fluxes for the first and second blocks based on the physical network information (block 1140). For example, in an implementation described above in connection with FIG. 6, execution engine 440 may calculate convection power fluxes for first block 560-1 and second block 560-2 based on information associated with physical network 510 (e.g., the volume, temperature, pressure, etc. associated with orifice 520 and chamber 530), and may calculate conduction power fluxes for first block 560-1 and second block 560-2 based on the information associated with physical network 510.

Returning to FIG. 11, process 1100 may include combining the convection power flux and the conduction power flux for the first block to determine a power flux for the first block for all mass flows (block 1150), and combining the convection power flux and the conduction power flux for the second block to determine a power flux for the second block for all mass flows (block 1160). For example, in an implementation described above in connection with FIG. 6, execution engine 440 may combine the convection power flux and the conduction power flux for first block 560-1 to determine a power flux for first block 560-1 for all mass flows, as indicated by reference number 620. Execution engine 440 may combine the convection power flux and the conduction power flux for second block 560-2 to determine a power flux for second block 560-2 for all mass flows, as further indicated by reference number 620.

Figure 12:
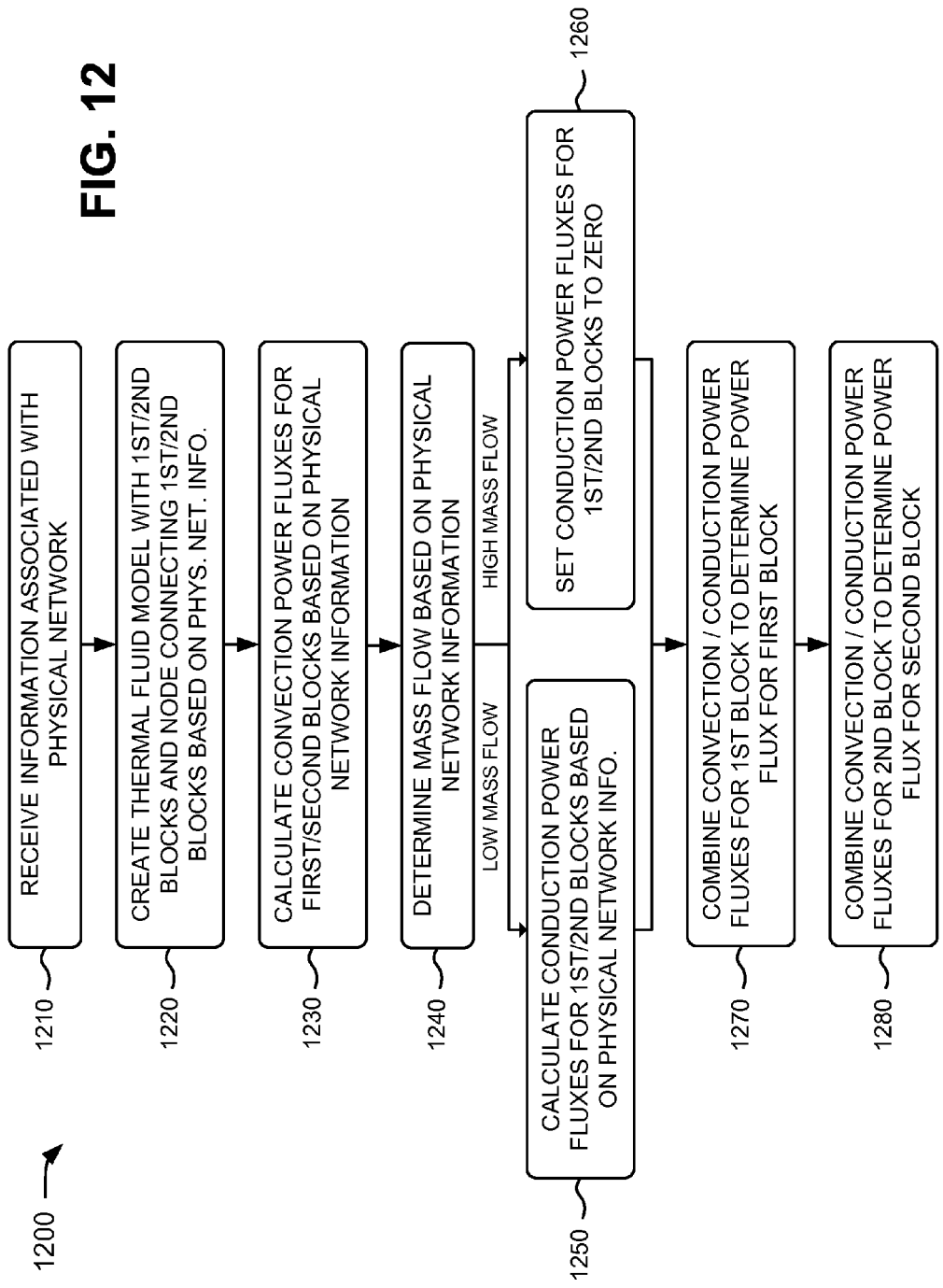
FIG. 12 is a flow chart of another example process for thermal fluid modeling with a physical network approach and using conduction and convection.

FIG. 12 is a flow chart of another example process 1200 for thermal fluid modeling with a physical network approach and using conduction and convection. In one implementation, process 1200 may be performed by client device 210/TCE 240. Alternatively, or additionally, process 1200 may be performed by another device or a group of devices separate from or including client device 210/TCE 240.

As shown in FIG. 12, process 1200 may include receiving information associated with a physical network (block 1210), and creating a thermal fluid model, with first and second blocks and a node connecting the first and second blocks, based on the physical network information (block 1220). For example, in an implementation described above in connection with FIG. 5, TCE 240 may utilize information associated with physical network 510 to create control volumes 540-1 and 540-2 for orifice 520 and chamber 530, respectively. TCE 240 may utilize control volumes 540-1 and 540-2 to create thermal fluid model 550. For example, TCE 240 may utilize control volumes 540-1 and 540-2 to create blocks 430, such as first block (block I) 560-1 and second block (block II) 560-2 interconnected by node (N) 570. First block 560-1, second block 560-2, and node 570 may form thermal fluid model 550.

As further shown in FIG. 12, process 1200 may include calculating convection power fluxes for the first and second blocks based on the physical network information (block 1230), and determining a mass flow based on the physical network information (block 1240). For example, in an implementation described above in connection with FIG. 6, execution engine 440 may calculate convection power fluxes for first block 560-1 and second block 560-2 based on information associated with physical network 510 (e.g., the volume, temperature, pressure, etc. associated with orifice 520 and chamber 530). Execution engine 440 may determine a mass flow of thermal fluid model 550 based on the information associated with physical network 510.

Returning to FIG. 12, for low mass flow (block 1240—LOW MASS FLOW), process 1200 may include calculating conduction power fluxes for the first and second blocks based on the physical network information (block 1250). For high mass flow (block 1240—HIGH MASS FLOW), process 1200 may include setting the conduction power fluxes for the first and second blocks to zero (block 1260). For example, in an implementation described above in connection with FIG. 6, for a low mass flow, execution engine 440 may calculate the conduction power fluxes for first block 560-1 and second block 560-2 based on the information associated with physical network 510. A low mass flow may occur when a flow of a fluid mass approaches zero, such as when a Peclet number (Pe) associated with the fluid mass is: $-2 \leq Pe \leq 2$. For a high mass flow, execution engine 440 may set the conduction power fluxes for first block 560-1 and second block 560-2 to zero. A high mass flow may occur when a Peclet number (Pe) associated with the fluid mass is: $Pe \leq -2$ or $Pe \geq 2$.

As further shown in FIG. 12, process 1200 may include combining the convection power flux and the conduction power flux for the first block to determine a power flux for the first block (block 1270), and combining the convection power flux and the conduction power flux for the second block to determine a power flux for the second block (block 1280). For example, in an implementation described above in connection with FIG. 6, execution engine 440 may combine the convection power flux and the conduction power flux for first block 560-1 to determine a power flux for first block 560-1 for low or high mass flows. Execution engine 440 may combine the convection power flux and the conduction power flux for second block 560-2 to determine a power flux for second block 560-2 for low or high mass flows.

CONCLUSION

Systems and/or methods described herein may model thermal fluid problems using the physical network approach, and may provide solutions to the thermal fluid problems that are physically correct, numerically robust, and easy to use. The systems and/or methods may give proper physical treatment to a node in a thermal fluid model so that the node enthalpy (or temperature) may not instantaneously jump from one block enthalpy to another block enthalpy. Such an arrangement may provide a simulation system that does not experience numerical issues.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 11 and 12, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving information, associated with a physical network, for generating a thermal fluid model in a technical computing environment (TCE),
the receiving being performed by one or more devices, and
the thermal fluid model including at least a first block, a second block, and a node connecting the first block and the second block;
calculating a first convection power flux, along a first direction of a simulated mass flow, for the first block of the thermal fluid model and a second convection power flux, along the first direction of the simulated mass flow or a second direction opposite to the first direction, for the second block of the thermal fluid model,
the calculating the first convection power flux and the second convection power flux being performed by the one or more devices and based on the received information;
calculating a first conduction power flux, along the first direction or the second direction, or setting the first conduction power flux to be zero, for the first block of the thermal fluid model and a second conduction power flux, along the first direction or the second direction, or setting the first conduction power flux to be zero, for the second block of the thermal fluid model,
the calculating the first conduction power flux and the second conduction power flux being performed by the one or more devices and based on the received information;
combining the first convection power flux and the first conduction power flux to determine a first power flux for the first block,
the combining the first convection power flux and the first conduction power flux being performed by the one or more devices;
combining the second convection power flux and the second conduction power flux to determine a second power flux for the second block,
the combining the second convection power flux and the second conduction power flux being performed by the one or more devices; and
solving one or more portions of the thermal fluid model as a solvable singularity-free system using the first power flux and the second power flux,
the solving being performed by the one or more devices.

2. The method of claim 1, where the information associated with the physical network includes one or more of:
information about control volumes of the physical network;
information about a volume of each of the control volumes;
information about a temperature of each of the control volumes; or
information about a pressure of each of the control volumes.

3. The method of claim 1, where the first convection power flux and the second convection power flux include an energy flow carried by a fluid flow.

4. The method of claim 1,
where calculating the first convection power flux for the first block is based on an equation that includes:

$$\Phi_{I \to N}^{convection} = \begin{cases} \dot{m}h_I, \dot{m} \leq 0 \text{ kg} \cdot s^{-1} \\ \dot{m}h_N, \dot{m} < 0 \text{ kg} \cdot s^{-1} \end{cases},$$

and
where $\Phi_{I \to N}^{convection}$ is the first convection power flux, $\dot{m}$ is a mass flow associated with the thermal fluid model, $h_I$ is an enthalpy of the first block, and $h_N$ is an enthalpy of the node.

5. The method of claim 1,
where calculating the second convection power flux for the second block is based on an equation that includes:

$$\Phi_{II \to N}^{convection} = \begin{cases} -\dot{m}h_N, \dot{m} \geq 0 \text{ kg} \cdot s^{-1} \\ -\dot{m}h_{II}, \dot{m} < 0 \text{ kg} \cdot s^{-1} \end{cases},$$

and
where $\Phi_{II \to N}^{convection}$ is the second convection power flux, $\dot{m}$ is a mass flow associated with the thermal fluid model, $h_{II}$ is an enthalpy of the second block, and $h_N$ is an enthalpy of the node.

6. The method of claim 1, where the first conduction power flux and the second conduction power flux include an energy flow that is independent of a fluid flow.

7. The method of claim 1,
where calculating the first conduction power flux for the first block is based on an equation that includes:

$\Phi_{I \to N}^{conduction} = G_{th}^{I}(T_I - T_N)$, and where $\Phi_{I \to N}^{conduction}$ is the first conduction power flux, $G_{th}^{I}$ is a physical characteristic of the first block, $T_I$ is a temperature of the first block, and $T_N$ is a temperature of the node.

8. The method of claim 1,
where calculating the second conduction power flux for the second block is based on an equation that includes:

$\Phi_{II \to N}^{conduction} = G_{th}^{II}(T_{II} - T_N)$, and where $\Phi_{II \to N}^{conduction}$ is the second conduction power flux, $G_{th}^{II}$ is a physical characteristic of the second block, $T_{II}$ is a temperature of the second block, and $T_N$ is a temperature of the node.

9. The method of claim 1, further comprising:
creating the thermal fluid model based on a physical network approach that prevents the first block from sharing information, internal to the first block, with the second block and prevents the second block from sharing information, internal to the second block, with the first block.

10. The method of claim 1, further comprising:
determining a mass flow associated with the thermal fluid model; and
setting the first conduction power flux and the second conduction power flux to zero when the mass flow is a high mass flow, as determined by a Peclet number associated with the thermal fluid model.

11. The method of claim 10, where the mass flow is the high mass flow when the Peclet number is greater than two or less than negative two.

12. The method of claim 1, where the first power flux and the second power flux are determined for a zero mass flow and a non-zero mass flow between the first block and the second block of the thermal fluid model.

13. The method of claim 7, where the physical characteristic of the first block comprises a thermal conductance of the first block.

14. The method of claim 8, where the physical characteristic of the second block comprises a thermal conductance of the second block.

15. A device, comprising:
a processor to:
receive information, associated with a physical network, for generating a thermal fluid model in a technical computing environment (TCE),
the thermal fluid model including at least a first block, a second block, and a node connecting the first block and the second block,
calculate, based on the received information, a first convection power flux, along a first direction of a simulated mass flow, for the first block of the thermal fluid model and a second convection power flux, along the first direction of the simulated mass flow or a second direction opposite to the first direction, for the second block of the thermal fluid model,
calculate, based on the received information, a first conduction power flux, along the first direction of the simulated mass flow, for the first block of the thermal fluid model and a second conduction power flux, along the first direction or the second direction, or setting the second conduction power flux to be zero, for the second block of the thermal fluid model, add the first convection power flux and the first conduction power flux to determine a first power flux for the first block,
add the second convection power flux and the second conduction power flux to determine a second power flux for the second block, and
solve one or more portions of the thermal fluid models as a solvable singularity-free system using the first power flux and the second power flux.

16. The device of claim 13, where the information associated with the physical network includes one or more of:
information about control volumes of the physical network;
information about a volume of each of the control volumes;
information about a temperature of each of the control volumes; or
information about a pressure of each of the control volumes.

17. The device of claim 15, where the first convection power flux and the second convection power flux include an energy flow carried by a fluid flow.

18. The device of claim 15,
where the processor is further to:
calculate the first convection power flux for the first block based on an equation that includes:

$$\Phi_{I \to N}^{convection} = \begin{Bmatrix} \dot{m} h_I, \dot{m} \geq 0 \text{ kg} \cdot s^{-1} \\ \dot{m} h_N, \dot{m} < 0 \text{ kg} \cdot s^{-1} \end{Bmatrix},$$

and
where $\Phi_{I \to N}^{convection}$ is the first convection power flux, $\dot{m}$ is a mass flow associated with the thermal fluid model, $h_I$ is an enthalpy of the first block, and $h_N$ is an enthalpy of the node.

19. The device of claim 15,
where the processor is further to:
calculate the second convection power flux for the second block based on an equation that includes:

$$\Phi_{II \to N}^{convection} = \begin{Bmatrix} -\dot{m} h_N, \dot{m} \geq 0 \text{ kg} \cdot s^{-1} \\ -\dot{m} h_{II}, \dot{m} < 0 \text{ kg} \cdot s^{-1} \end{Bmatrix},$$

and
where $\Phi_{II \to N}^{convection}$ is the second convection power flux, $\dot{m}$ is a mass flow associated with the thermal fluid model, $h_{II}$ is an enthalpy of the second block, and $h_N$ is an enthalpy of the node.

20. The device of claim 15, where the first conduction power flux and the second conduction power flux include an energy flow that is independent of a fluid flow.

21. The device of claim 15,
where the processor is further to:
calculate the first conduction power flux for the first block based on an equation that includes:

$$\Phi_{I \to N}^{conduction} = G_{th}^{I}(T_I - T_N), \text{ and}$$

where $\Phi_{I \to N}^{conduction}$ the first conduction power flux, $G_{th}^{I}$ is a physical characteristic of the first block, $T_I$ is a temperature of the first block, and $T_N$ is a temperature of the node.

22. The device of claim 15,
where the processor is further to:
calculate the second conduction power flux for the second block is based on an equation that includes:

$$\Phi_{II \to N}^{conduction} = G_{th}^{II}(T_{II} - T_N), \text{ and}$$

where $\Phi_{II \to N}^{conduction}$ is the second conduction power flux, $G_{th}^{II}$ is a physical characteristic of the second block, $T_{II}$ is a temperature of the second block, and $T_N$ is a temperature of the node.

23. The device of claim 15, where the processor is further to:
create the thermal fluid model based on a physical network approach that prevents the first block from sharing information, internal to the first block, with the second block and prevents the second block from sharing information, internal to the second block, with the first block.

24. The device of claim 15, where the processor is further to:
determine a mass flow associated with the thermal fluid model, and
set the first conduction power flux and the second conduction power flux to zero when the mass flow is a high mass flow, as determined by a Peclet number associated with the thermal fluid model.

25. The device of claim 24, where the mass flow is the high mass flow when the Peclet number is greater than two or less than negative two.

26. The device of claim 21, where the physical characteristic of the first block comprises a thermal conductance of the first block.

27. The device of claim 22, where the physical characteristic of the second block comprises a thermal conductance of the second block.

28. One or more non-transitory computer-readable media, comprising:
one or more instructions that, when executed by a processor of a device, cause the processor to:
receive information associated with a physical network for generating a thermal fluid model in a technical computing environment (TCE),
the thermal fluid model including at least a first block, a second block, and a node connecting the first block and the second block,
calculate, based on the received information, a first convection power flux, along a first direction of a simulated mass flow, for the first block of the thermal fluid model and a second convection power flux, along the first direction of the simulated mass flow or a second direction opposite to the first direction, for the second block of the thermal fluid model, calculate, based on the received information, a first conduction power flux, along the first direction or the second direction, or setting the first conduction power flux to be zero, for the first block of the thermal fluid model and a second conduction power flux, along the first direction or the second direction, or setting the second conduction power flux to be zero, for the second block of the thermal fluid model, add the first convection power flux and the first conduction power flux to determine a first power flux for the first block, add the second convection power flux and the second conduction power flux to determine a second power flux for the second block, and solve one or more portions of the thermal fluid model as a solvable singularity-free system using the first power flux and the second power flux.

29. The one or more non-transitory computer-readable media of claim 28, where the first convection power flux and the second convection power flux include an energy flow carried by a fluid flow.

30. The one or more non-transitory computer-readable media of claim 28, further comprising:
one or more instructions that, when executed by the processor, cause the processor to:
calculate the first convection power flux for the first block based on an equation that includes:

$$\Phi_{I \to N}^{convection} = \begin{cases} \dot{m} h_I, \dot{m} \geq 0 \text{ kg} \cdot s^{-1} \\ \dot{m} h_N, \dot{m} < 0 \text{ kg} \cdot s^{-1} \end{cases},$$

where $\Phi_{I \to N}^{convection}$ is the first convection power flux, $\dot{m}$ is a mass flow associated with the thermal fluid model, $h_I$ is an enthalpy of the first block, and $h_N$ is an enthalpy of the node.

31. The one or more non-transitory computer-readable media of claim 28, further comprising:
one or more instructions that, when executed by the processor, cause the processor to:
calculate the second convection power flux for the second block based on an equation that includes:

$$\Phi_{II \to N}^{convection} = \begin{cases} -\dot{m} h_N, \dot{m} \geq 0 \text{ kg} \cdot s^{-1} \\ -\dot{m} h_{II}, \dot{m} < 0 \text{ kg} \cdot s^{-1} \end{cases},$$

where $\Phi_{II \to N}^{convection}$ is the second convection power flux, $\dot{m}$ is a mass flow associated with the thermal fluid model, $h_{II}$ is an enthalpy of the second block, and $h_N$ is an enthalpy of the node.

32. The one or more non-transitory computer-readable media of claim 28, where the first conduction power flux and the second conduction power flux include an energy flow that is independent of a fluid flow.

33. The one or more non-transitory computer-readable media of claim 28, further comprising:
one or more instructions that, when executed by the processor, cause the processor to:
calculate the first conduction power flux for the first block based on an equation that includes:

$$\Phi_{II \to N}^{conduction} = G_{th}^{II}(T_{II} - T_N),$$

where $\Phi_{II \to N}^{conduction}$ is the first conduction power flux, $G_{th}^{II}$ is a physical characteristic of the first block, $T_I$ is a temperature of the first block, and $T_N$ is a temperature of the node.

34. The one or more non-transitory computer-readable media of claim 28, further comprising:
one or more instructions that, when executed by the processor, cause the processor to:
calculate the second conduction power flux for the second block is based on an equation that includes:

$$\Phi_{II \to N}^{conduction} = G_{th}^{II}(T_{II} - T_N),$$

where $\Phi_{II \to N}^{conduction}$ is the second conduction power flux, $G_{th}^{II}$ is a physical characteristic of the second block, $T_{II}$ is a temperature of the second block, and $T_N$ is a temperature of the node.

35. The one or more non-transitory computer-readable media of claim 28, further comprising:
one or more instructions that, when executed by the processor, cause the processor to:
create the thermal fluid model based on a physical network approach that prevents the first block from sharing information, internal to the first block, with the second block and prevents the second block from sharing information, internal to the second block, with the first block.

36. The one or more non-transitory computer-readable media of claim 28, further comprising:
one or more instructions that, when executed by the processor, cause the processor to:
determine a mass flow associated with the thermal fluid model, and
set the first conduction power flux and the second conduction power flux to zero when the mass flow is a high mass flow, as determined by a Peclet number associated with the thermal fluid model.

37. The one or more non-transitory computer-readable media of claim 33, where the physical characteristic of the first block comprises a thermal conductance of the first block.

38. The one or more non-transitory computer-readable media of claim 34, where the physical characteristic of the second block comprises a thermal conductance of the second block.

* * * * *